Sept. 6, 1966 J. W. DAWSON ETAL 3,271,574
DATA HANDLING AND CONTROL CIRCUIT FOR LIQUID
SCINTILLATION SPECTROMETERS
Filed April 16, 1963 4 Sheets-Sheet 1

INVENTORS
John W. Dawson
Michael J. Long
BY
Anderson, Luebka, Fitch, Even & Tabin
ATTORNEYS

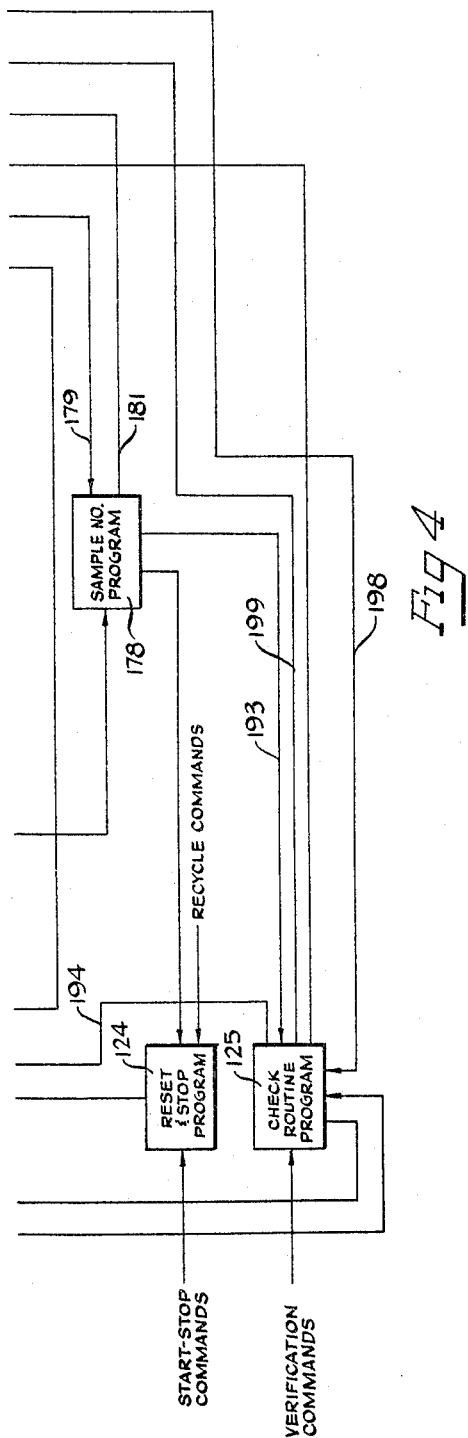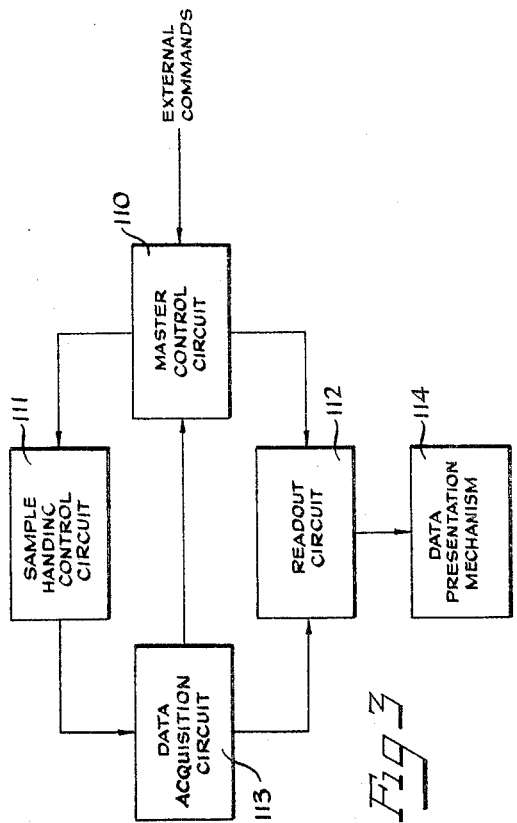

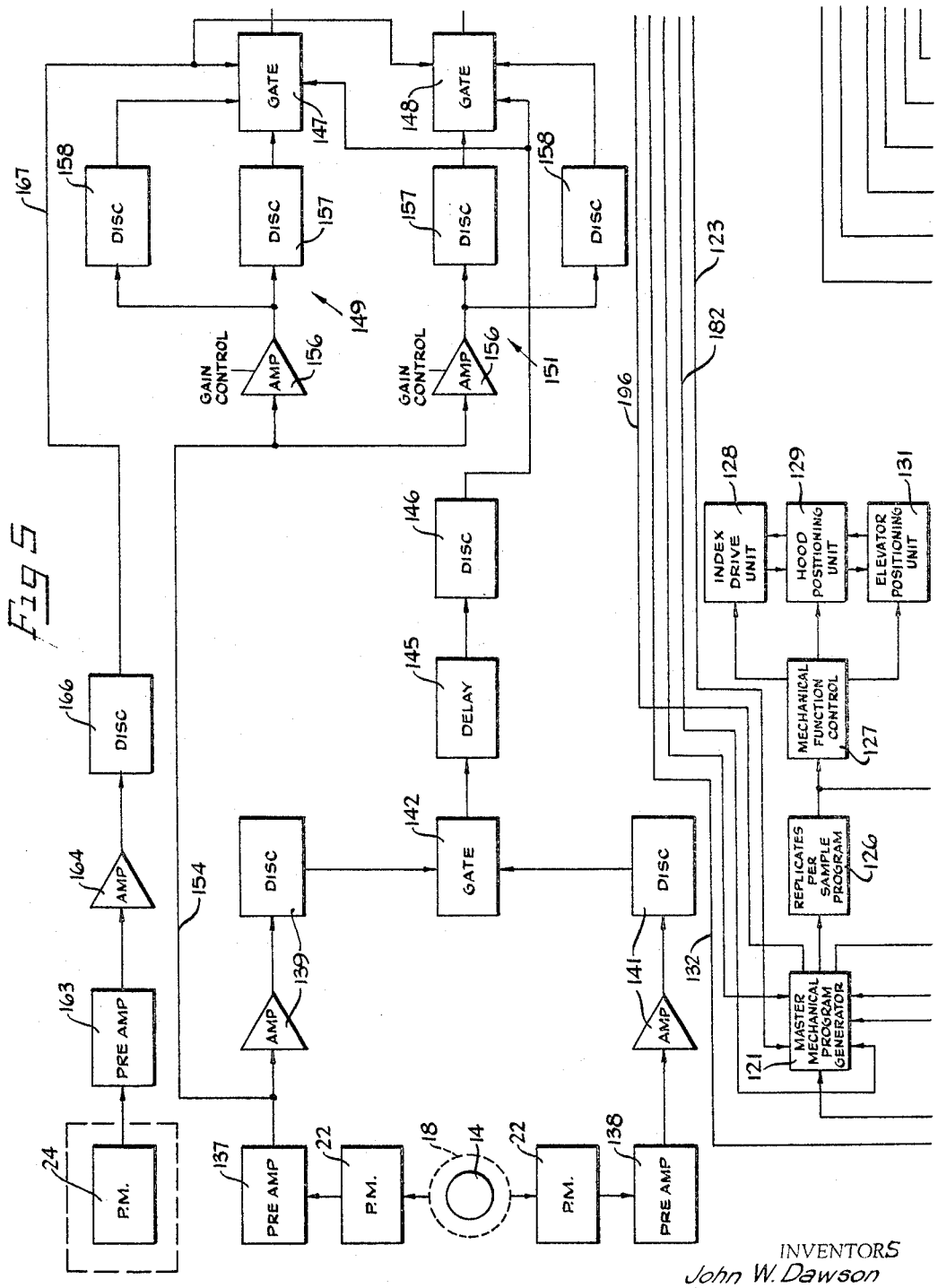

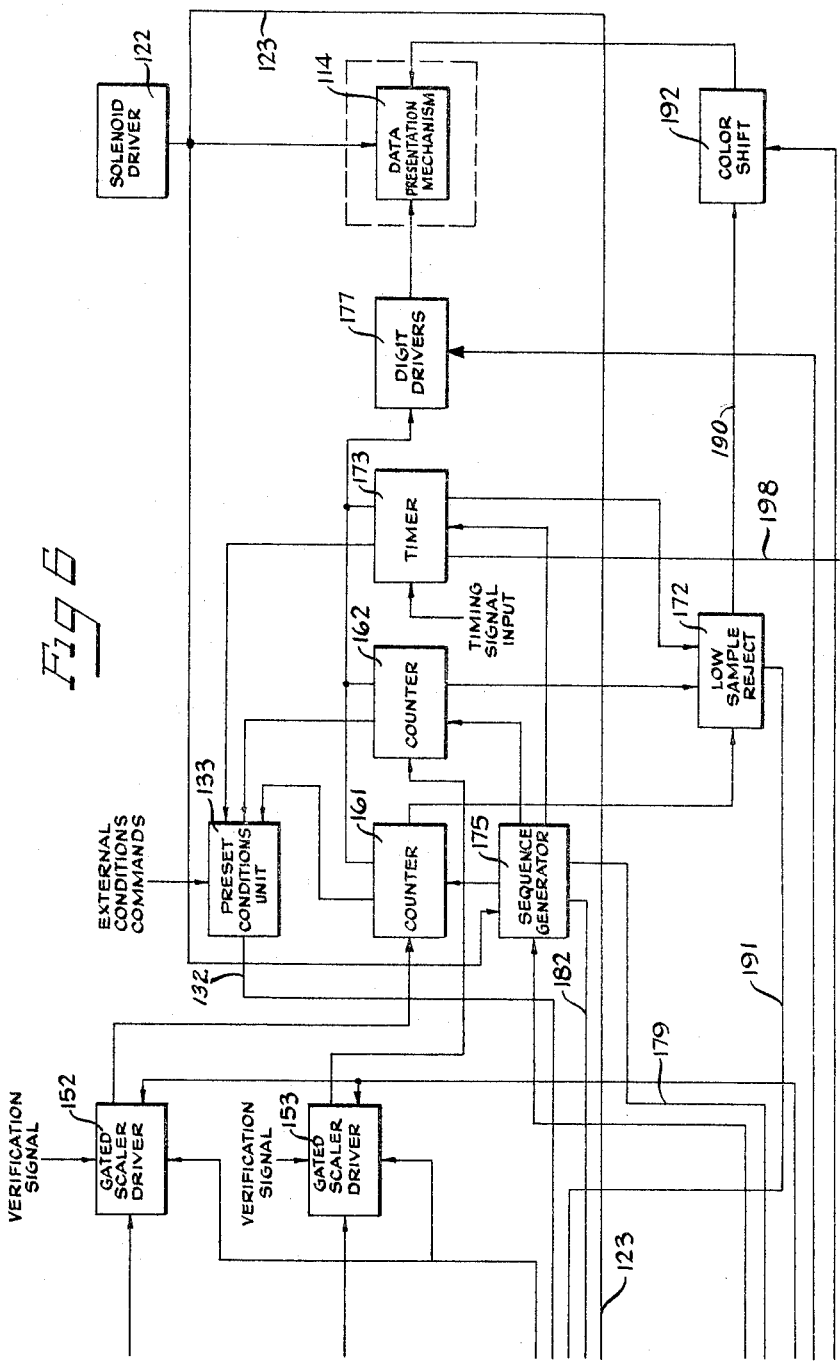

United States Patent Office 3,271,574
Patented Sept. 6, 1966

3,271,574
DATA HANDLING AND CONTROL CIRCUIT FOR LIQUID SCINTILLATION SPECTROMETERS
John W. Dawson, Clarendon Hills, and Michael J. Long, Chicago, Ill., assignors to Vanguard Instrument Corporation, Berwyn, Ill., a corporation of Illinois
Filed Apr. 16, 1963, Ser. No. 273,499
2 Claims. (Cl. 250—106)

This invention relates to liquid scintillation spectrometers and, more particularly, to an improved circuit for controlling the automatic operation thereof.

In a copending application of the common assignee Serial No. 273,500 that was filed on April 16, 1963, an improved liquid scintillation spectrometer is disclosed which, as outlined therein, can be employed in connection with a variety of medical, biological and other refined experiments. This copending application discloses and claims various novel structural and functional features of the spectrometer, the operation of which is controlled and synchronized by the circuit of the present invention.

It is therefore a prime object of the present invention to provide an improved circuit for controlling the automatic operation of a liquid scintillation spectrometer such as that disclosed in the aforementioned copending application.

A further object of the present invention is to provide a circuit that controls and synchronizes the operation of motor controlled sample handling instrumentalities, scintillation detection circuitry and data presentation devices in a liquid scintillation spectrometer.

Another object of the present invention is to provide a spectrometer control circuit including detection circuitry that yields signals corresponding to sample characteristics one desires to measure, while at the same time eliminating undesirable background signals.

An additional object of the present invention is to provide a circuit that can be selectively employed in a liquid scintillation spectrometer to effect single or multiple consecutive detecting operations on a plurality of samples.

Still another object of the present invention is to provide a control circuit for a spectrometer that can be selectively operated so that only samples having particular characteristics undergo complete detecting operations.

A more finite object of the present invention is to provide an improved circuit that automatically controls the operation of a liquid scintillation spectrometer and includes circuitry for checking the reliability of data storage and readout circuits employed therein.

Other objects and advantages of the present invention will become apparent from the detailed description when considered in conjunction with the accompanying drawings wherein:

FIGURE 3 is a block diagrammatic illustration of the major components of the control circuit of the present invention;

FIGURES 4–6 are diagrammatic representations of the operating circuits which comprise the major circuit components illustrated in FIGURE 4 but with conventional detailed circuitry (e.g. relay circuits, gate circuits, etc.) represented in block form; and FIGURE 7 is a view illustrating the manner in which FIGURES 4–6 are arranged to connect the various circuits in operating fashion.

Figures 1, 2:
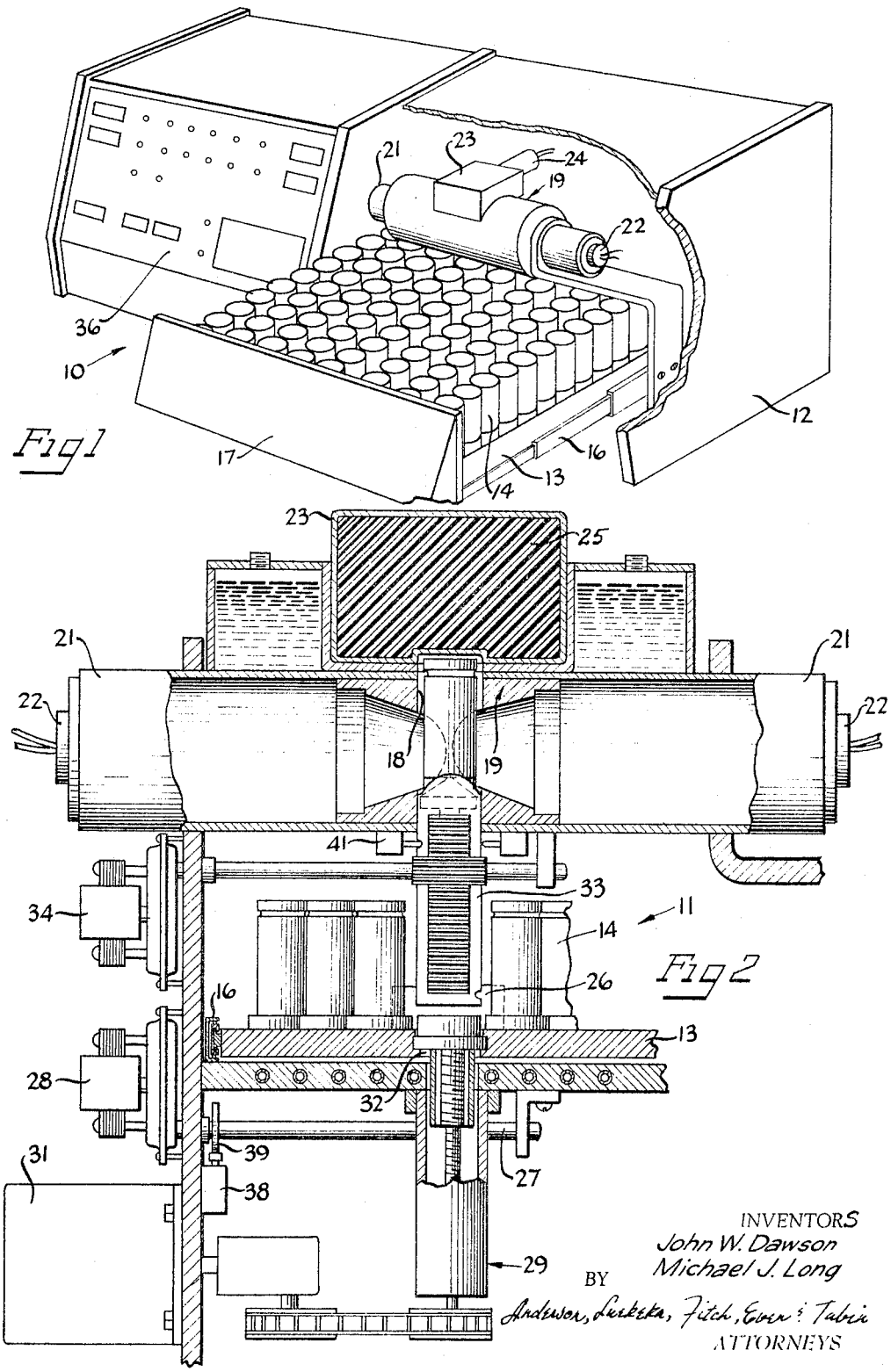
FIGURE 1 is an isometric view of a spectrometer wherein the control circuit of the present invention may be employed, which view illustrates various of the mechanical devices controlled by the circuit.
FIGURE 2 is a cross sectional view of a portion of the spectrometer further illustrating various of the instrumentalities which are actuated and controlled by the control circuit of the present invention.

With reference to the drawings, the circuit of the present invention is hereinafter described as employed in the liquid scintillation spectrometer disclosed and claimed in the aforementioned application of the common assignee. Although not limited to use therein, the control circuit of the present information will best be understood when so described in conjunction with the structural elements controlled thereby and shown in FIGURES 1–2.

By way of background and as disclosed in the aforementioned copending application, the liquid scintillation spectrometer, generally designated herein by the numeral 10, includes a sample handling mechanism 11 that is confined within a console or cabinet 12. The console 12 is adapted to receive a sample handling tray 13 preferably having a capacity to receive one hundred radioactively tagged samples, each of which is dissolved in a suitable liquid scintillation medium and confined within a separate vial 14.

The sample carrying tray 13 is preferably removably mounted within a slidable support structure 16 that is secured to a suitable door 17 that mates with an opening in the console. When a sample carrying tray 13 has been positioned within the console (i.e. the door 17 is closed), the tray lies below a detection chamber 18 (FIG. 2) that is adapted to receive each of sample vials in sequence. The detection chamber 18 is defined by a shielded housing 19 whereto a pair of tubular channel defining members 21 are secured. The channels defined by the members 21 are each adapted to receive and house photomultiplier tubes 22 so that these tubes are maintained in optical communication with a sample containing vial 14 when positioned within the detection chamber 18. A block 25 of luminophor material confined within a casing 23 of stainless steel or the like is mounted on the shielded housing 19 and above the detection chamber 18. As shown in FIGURE 1, the casing is adapted to receive a third photomultiplier tube 24 so that this tube is maintained in optical communication with the luminophor block.

When a tray of samples is suitably positioned within the console 12 as indicated in FIGURE 1, an indexing cam 26 on the tray 13 is drivingly connected to a driven shaft 27 of an index drive motor 28. As the drive motor 28 is intermittently energized, the cam 26 advances a sample carrying vial (i.e. preferably the No. 1 sample) into alignment with an elevator mechanism 29 that will advance the vital into the detection chamber 18. As shown in FIGURE 2, the elevator mechanism 29 is located beneath the level of the removable tray. In response to the energization of an elevator drive motor 31, the elevator mechanism 29 passes upwardly through an aperture 32 in the tray to lift the sample carrying vial into the detection chamber 18 for examination. In this connection, before the elevator motor is energized, an enshrouding hood 33, which is normally recessed within the chamber 18, is advanced downwardly from the chamber under the control of a motor 34 to surround the sample and thereby provide an uninterrupted guide channel communicating with the detection chamber.

Upon the completion of the examination of the sample, as hereinafter fully described, the elevator mechanism 29 descends and returns the sample carrying vial 14 to the tray, the hood retracts into the detection chamber 18, and the indexing cam is actuated to initiate a subsequent cycle of operation. This sequence of operation is repeated until each sample carrying vial 14 on the tray 13 has been examined. The door 17 of the console is then opened, the tray removed and a similar tray of samples which have been awaiting examination is introduced into the spectrometer.

The controlled automatic operation of a liquid scintillation spectrometer which is effected by the circuit of the present invention will best be understood from a general consideration of the motor control, detecting and read-out circuits which are diagrammatically represented in FIGURE 3 and shown more specifically in FIGURES 4–6.

As shown in FIGURE 3, a number of external commands, which are preferably established by the selective actuation of push button switches and/or dial settings on the control panel 36 of the spectrometer 10 (FIGURE 1), are fed to a master control circuit 110. Output signals from the master control circuit 110 are fed to a sample handling control circuit 111 and a read-out circuit 112.

The sample handling circuit 111 controls the energization of a plurality of drive motors that function to advance the sample carrying vials 14 to a location adjacent the detection chamber 18 and effect the positioning of the vials therein, as previously described. In this connection, no actuating signal is supplied from the master control circuit 110 to the read-out circuit 112 until both the functions performed by the sample handling control circuit 111 and the examination of the sample are completed.

More particularly, when a sample carrying vial 14 is positioned in the detection chamber 18 for examination, radioactive decay events which randomly occur within the sample effect light emissions in the scintillation medium wherein the sample is dissolved. These scintillations are "seen" by the photomultipliers 22, which are mounted within housing 19, and signal pulses corresponding thereto are simultaneously produced by the photomultipliers. These signals are fed to suitable counters associated with a data acquisition circuit 113.

When the data acquisition circuit yields a signal indicative of certain preset count or time conditions having been reached, as hereinafter described, the master control circuit 110 supplies an output signal to the read-out circuit 112, and the readout of information stored within the data acquisition circuit is initiated. Accordingly, the information stored within the data acquisition circuit 113 is fed to a suitable data presentation mechanism 114 which may, for example, be an electrically controlled typewriter. After the readout of the stored information has been completed, the master control circuit 110 again initiates the actuation of the drive motors for the sample handling devices thereby causing the sample which has just been examined to be withdrawn from the sample detection chamber 18. After this occurs, the next succeeding sample is advanced into the detection chamber and the cycle is repeated as generally outlined above.

The individual circuits which comprise the various blocks illustrated in FIGURE 3 and the detailed manner in which these circuits function will best be understood from a consideration of FIGURES 4–6. However, for purposes of the following detailed description, the successive operations performed on one sample containing vial 14 are initially described without reference to various auxiliary circuits which are selectively employed in particular instances. Thereafter, these auxiliary circuits are fully described as is the manner in which the operation of the spectrometer is modified when these auxiliary circuits are employed.

Assuming that a tray 13 containing one hundred sample carrying vials 14 has been properly positioned within the console 12, the spectrometer 10 is ready to effect the examination of each of the samples pursuant to the operational mode dictated by the control circuit. In this connection, external commands (e.g. dial settings and/or the actuation of push buttons) condition a "master mechanical program generator" 121 for operation.

This master mechanical program generator 121, which synchronizes the operation of the control circuit, is a conventional solenoid actuated stepping switch that has energizing pulses sequentially supplied thereto from a synchronous solenoid driver circuit 122 (FIGURE 6) through an output line 123. The synchronous solenoid driver circuit 122 is preferably a transistorized pulse forming network that supplies negative square wave pulses at a preselected repetition rate (e.g. 10 cycles per second). A pulse rate of this magnitude is desirable inasmuch as the synchronous solenoid driver 122 also supplies energizing square wave pulses to data presentation mechanism 114 associated with the spectrometer.

The negative square wave pulses that are successively supplied to the solenoid of the stepping switch that constitutes the master mechanical program generator 121 effect the advancement of the stepping switch over the contacts provided thereby so that specific functional circuits are sequentially rendered effective. More particularly, each contact of the stepping switch is preferably associated with one circuit that controls a specific spectrometer operation, which operation is completed before the stepping switch is advanced to the next succeeding contact. However, when a suitable grounding circuit is thereafter provided for the solenoid through the then engaged contact of the stepping switch and the circuit associated therewith, the solenoid is energized and the stepping switch is advanced to cause the next succeeding spectrometer operation to be carried out.

More particularly, when the program generator 121 is conditioned for operation by external commands supplied through a reset-stop program unit 124 and a check routine program unit 125, a suitable energizing circuit is completed for a mechanical function control unit 127 through a replicates per sample program unit 126. As hereinafter described, the replicates per sample program unit 126 is another stepping switch connected in circuit with the program generator 121. This stepping switch circuit allows the sample containing vials 14 to be retained within the sample detection chamber 18 so that successive sample examinations can be carried out.

The mechanical function control unit 127 includes a conventional power supply circuit that controls the operation of the various drive motors 28, 31 and 34 associated with the spectrometer. More particularly, the mechanical function control unit 127 selectively supplies power to an index drive unit 128, a hood positioning unit 129 and an elevator positioning unit 131. In a preferred embodiment of the invention, each of these units includes the drive motors for the sample handling devices and one or more limit switches which are connected in the motor control circuits so as to dictate the sequential operation of these drive motors in conjunction with the program generator 121 and the mechanical function control unit 127.

In this connection, after a tray 13 has been properly placed within the console 12, a pushbutton on the control panel 36 is actuated by the spectrometer operator. As a result, the relay circuit of the reset and stop program unit, whereto this external command is supplied, actuates program generator 121 to provide an output signal to the control unit 127. The mechanical function control unit then supplies energizing current to the drive motor in the index drive unit 128. When energized, the index drive motor 28 drives the cam 26 and the sample carrying vials 14 are advanced along the tray 13 until the designated "No. 1" sample carrying vial is positioned in alignment with the detection chamber 18.

In this connection, a limit switch mounted within the console adjacent the path of travel of the vials 14 initially controls the duration of operation of the indexing motor. When this switch is engaged by a specially proportioned vial supporting ring, the index motor is deenergized and the "No. 1" vial is aligned with the detection chamber. Thereafter, the intermittent duration of an indexing operation is controlled by a limit switch 38 that is engaged by a cam 39 secured to the driven shaft of the index drive motor 28.

When the designated "No. 1" sample carrying vial is thus aligned with the chamber 18 and the index drive motor has been stopped, the stepping switch of the program generator 121 is advanced and the drive motor 24 for the hood 33 is energized. As a result, the hood is advanced downwardly from the detection chamber 18 until the vial is encompassed thereby. As the hood approaches the limit of downward travel, a limit switch 41 (FIG. 2) associated with the hood positioning unit 129 is engaged thereby. The actuation of this limit switch results in the hood position motor being rendered ineffective and conditions the drive motor 31 of the elevator positioning unit 131 for operation. In this connection, the stepping switch of the program generator 121 is again advanced and the drive motor 31 is then rendered effective. The drive motor 31 in turn actuates the elevator 29 and the designated "No. 1" sample is thereby positioned in the detection chamber 18.

The upward advance of the elevator 29 is terminated when the vial 14 is properly aligned with the photomultiplier tubes 22 mounted within the shielded housing 19. More particularly, a limit switch (not shown) is positioned to be engaged when the elevator 29 approaches the limit of upward travel so that the elevator drive motor is deenergized. In addition, this limit switch provides an energizing circuit for the program generator stepping switch which is again advanced to initiate the examination of the sample.

However, to insure that the detecting and counting operations incident to sample examination are carried out without interruption, the energizing circuitry associated with the stepping switch of the program generator 121 is effectively open circuited. That is, the stepping switch solenoid cannot be energized until an output signal is supplied thereto through an output line 132 from a preset conditions unit 133 (FIG. 6). As shown the signal may be applied through a check routine program unit 125 in order that the signal may be intercepted during a check routine, as described below.

More particularly, the preset conditions unit 133 is preferably a binary circuit of conventional design that does not supply an energizing signal to the program generator 121 until certain preset conditions are met in the data acquisition circuit 113. As hereinafter described, when the preset conditions are met, a signal indicative of the termination of a sample examination is provided, and the binary circuit responds thereto by changing its conductive state. When this occurs, as energizing signal is supplied to the master mechanical program generator stepping switch.

As generally outlined above, the data acquisition circuit 113 functions to yield detectable output signals corresponding to the decay events occurring in the sample being examined. Moreover, this circuit allows radioactive decay events from two isotopes to be detected simultaneously. One preferred manner of accomplishing this is by employing a detecting circuit that includes two selectively variable analyzer channels which are adjustable to individually provide counts of only one isotope. Accordingly, the present invention includes a detecting circuit which is essentially an anticoincidence-coincidence circuit that employs separate channels for pulse height analysis (FIG. 5).

A consideration of a specific example of a typical sample which might be examined in the spectrometer 10 will enhance the following explanation of the data acquisition and readout circuits. In this connection, the spectrometer employing the circuit of the present invention can readily examine a sample containing, for example, both $C^{14}$ and $H^3$ (tritium). Preferably, the sample is prepared in a conventional manner by dissolving it in a toluene-phosphor solution confined within a vial 14. With the vial containing this sample positioned within the detection chamber 18, scintillations are caused to occur within the solution in the usual fashion as a result of randomly occurring decay events taking place in the sample.

Referring more particularly to FIGURE 5, successive decay events occurring in the sample, cause detectable scintillations in the solution wherein the sample is dissolved. These scintillations are seen by each of the photomultipliers 22, and output signals corresponding thereto are produced by the photomultipliers.

Assuming, for purposes of the present description, that a first decay event corresponds to the isotope $C^{14}$ and that a subsequent decay event corresponds to $H^3$, the signals corresponding thereto are separated for storage in separate counters in the data acquisition circuit 113.

More particularly, the signals produced by the photomultipliers 22 are amplified by preamplifiers 137 and 138 and, in a conventional manner, are fed through parallelly connected amplifier-discriminator circuits 139 and 141 to a conventional gate circuit 142. The amplifier-discriminator circuits 139 and 141 and the gate circuit 142 are utilized in the data acquisition circuit 113 to eliminate spurious thermal noise signals that would otherwise be present if only a single photomultiplier 22 were employed.

In the illustrated embodiment, the photomultiplier 22 and associated preamplifier 137 function as the primary or analyzer detector, whereas the other photomultiplier and preamplifier 138 function as a monitor for this primary detector. With this circuit arrangement, if signals are not simultaneously supplied to the gate circuit 142 from the circuits 139 and 141, no output signal is produced thereby. However, signals which are produced at the output of the gate circuit 142 are supplied to a delay circuit 145. The delay circuit 145, in turn, feeds a conventional discriminator 146, and the output from the discriminator circuit 146 is simultaneously fed to a pair of conventional gate circuits 147 and 148.

As shown in FIGURE 5, the gate circuits 147 and 148 are connected to the outputs of dual analyzing channels 149 and 151, and these circuits are also connected and supply input signals to gated scaler driver circuits 152 and 153, respectively.

More particularly, the delayed signal output from the discriminator 146 serves as coincidence signal information in the gate circuits 147 and 148. In this connection, the amplified output signals from the analyzer photomultiplier are fed to the dual analyzer channels 149 and 151, and after undergoing pulse height analysis therein are supplied to the gate circuits 147 and 148. If the signals from the channels 149 and 151 arrive at the gate circuits 147 and 148 in coincidence with the signal output from the discriminator 146, signal information is passed through the circuits 152 and 153 to the storage network.

Assuming as before that successive pulses corresponding to $H^3$ and $C^{14}$ are "seen" by the photomultipliers, the dual channel analyzers 149 and 151 function to separate these signals before transmission to the storage network. In this connection, each of the dual analyzer channels includes a conventional amplifier 156 having an adjustable gain and a differential discriminator circuit including parallelly connected discriminators 157 and 158 that have individually adjusted threshold voltages, hereinafter designated as $V_L$ and $V_H$, respectively.

Since it is known that $C^{14}$ tends to generate a signal spectrum having a magnitude substantially greater than that corresponding to $H^3$, the channels 149 and 151 are readily adjusted to pass only one spectrum. Preferably this is accomplished by adjusting the gain of each of the amplifiers 156 so that the major portions of the signal spectra of the dissimilar isotopes have substantially equal amplitudes in the separate channels. For example, the gain of each amplifier 156 is preferably adjusted so that the signal spectrum corresponding to $H^3$ decay events is passed by the channel 149 and that corresponding to $C^{14}$ decay events is passed by the channel 151. That is, the gain in each channel is adjusted so that the signals produced by the isotope to which the respective channels respond will fall within the preestablished threshold voltage range $V_L$–$V_H$. Accordingly, any signal having a magnitude of less than $V_L$ is blocked and any signal having a magnitude greater than $V_H$ is passed to provide an inhibiting pulse to the gate circuit associated therewith. The pulses passing the gate circuit are therefore those falling between $V_L$ and $V_H$.

In the illustrated embodiment, the discriminator circuits 157 are selected so that the output signals passed by the analyzer channels as described above have sufficient duration to insure that the corresponding signals supplied to the gate circuits 147 and 148 by the discriminator circuit 146 arrive at the gate circuits in coincidence therewith. When such coincidence exists, the gate circuits 147 and 148 pass the signals from the analyzer channels to the gated scaler driver circuits 152 and 153, which are preferably transistorized circuits providing two stages of signal amplification.

Although the gated scaler drivers 152 and 153 are normally inhibited by the program generator 121, the inhibiting signal is removed therefrom at the start of the sample examination operation after the vial 14 is positioned within the chamber 18. Accordingly, the gated scaler drivers function to pass amplified output signals separately to the counters 161 and 162 which correspond to the separate isotopes being detected. That is, signals or counts corresponding to $H^3$ are supplied to and stored within the counter 161, and counts corresponding to $C^{14}$ are supplied to and stored within the counter 162.

Before proceeding with the storage and read-out functions performed by the circuits of the present invention, consideration should be given to the effect of background radiation on sample examination effected by the spectrometer 10. It is well known that a local gamma and cosmic radiation have long been a source of trouble in connection with the accurate analysis of radioactive samples. The circuitry of the present invention includes means for minimizing the adverse effects of such background radiation so that a spectrometer employing same is an effective low background counter.

As previously described, a third photomultiplier tube 24 is mounted in optical communication with a plastic phosphor anticoincidence shield 25 that is positioned above the sample detection chamber 18. By employing this third photomultiplier tube 24 in conjunction with the scintillating medium, incident cosmic and/or local gamma radiation penetrating the sample containing vial 14 is detected. More particularly, any scintillations caused by background radiation striking this anticoincidence shield results in signals being produced by the photomultiplier which are amplified by a conventional preamplifier 163 and pulse amplifier 164. The output from the pulse amplifier 164 is fed to a discriminator circuit 166. The output from the discriminator 166 is supplied to each of the gate circuits 147 and 148. These signals serve to inhibit the gate circuits 147 and 148 and block the output therefrom when background radiation strikes the anticoincidence shield.

From the foregoing it can be seen that the detecting circuitry effectively supplies counts corresponding to different isotopes to the separate counters 161 and 162. Moreover, the effects of incident background radiation are minimized as a result of the use of an auxiliary anticoincidence circuit in conjunction with the dual channel pulse height analyzer circuit.

Considering now the data storage and read-out circuits of the present invention, the counters 161 and 162 are preferably six decade counters that provide ten lines of gated output and four lines of ungated output and have a capacity of $10^6$ counts. More particularly, each decade includes four binary circuits with appropriate feedback.

During the examination of a sample as outlined above, the ten lines of gated output of each of the counters do not supply output signals. However, the ungated lines from each of the counters 161 and 162 that are fed to the preset conditions unit 133 are continuously supplying output information thereto. Likewise, output information derived from the counters is fed through other ungated output lines to a low sample reject circuit 172, which is more fully hereinafter described.

Pursuant to specific external commands, the preset conditions unit 133 (i.e. the gate circuit employed therein) responds to information stored within data acquisition circuit 113 to allow the mechanical program generator 121 to terminate a counting operation. More particularly, the preset conditions unit 133 can be selectively conditioned to respond to either a preselected number of counts in the counter 161, a preselected number of counts in the counter 162, or the lapse of a preselected counting time period as indicated by a signal derived from timer circuit 173 so that versatile spectrometer operation can be realized. Preferably, the timer circuit 173 includes four decades that are supplied with a plurality of successive timing signals from a pulse generator (not shown) of conventional design. As previously described in connection with the counters 161 and 162, the ungated output lines of the timer 173 are fed to the low sample reject circuit 172 as well as the preset conditions unit 133.

Assuming, for example, that one desires to examine a sample until either 10,000 counts are recorded on either counter or until a period of 90 seconds has elapsed, the sample containing vial 14 is maintained in the detection chamber 18 until one of these three conditions has been reached. Assuming further that the sample being measured is relatively inactive and that the 90 second period elapses before the preset number of counts is realized, the ungated output from the timer circuit 173 supplies an output signal to the gate circuit in the preset conditions unit 133.

In response to this output signal, the conductive state of the gate circuit changes and supplies an output signal to the master mechanical program generator 121 through the check routine program unit 125. As a result, the stepping switch in the master mechanical program generator 121 is energized, and the switch advances one position. Having thus advanced, the master mechanical program generator provides an energizing circuit for a sequence generating circuit 175.

The sequence generator 175 preferably includes five binary circuits with a suitable matrix to provide 32 lines of output. This circuit is normally inhibited by the master mechanical program generator until one of the preset conditions has been realized as outlined above. When the preset conditions unit 133 advances the program generator stepping switch, the inhibiting signal from the program generator is removed from the sequence generator. This operation initiates the readout of the stored information from the counters 161 and 162 and from the timer 173 and results in this information being produced by the data presentation mechanism 114.

The input to the sequence generator 175 is supplied by the synchronous solenoid driver 122 which, as previously described, supplies square wave pulses to the data presentation mechanism 114 as well as the program generator 121. Accordingly, the readout of information effected by the sequence generator 175 is synchronized with the energizing pulses supplied to the data presentation mechanism. In this connection, output pulses from the sequence generator 175 sequentially bias each of the gated outputs of the counters 161 and 162 and the timer 173 so that the information stored therein is presented to the data presentation mechanism in a desired sequence. Referring to FIGURE 6, it will be seen that the output from the counters and timers is supplied to a digit driver circuit 177 associated with the data presentation mechanism 114. In the conventional manner, the digit driver circuit 177 completes the circuit for energizing pulses supplied by the synchronous generator through the counters and timer to the solenoids that control the operation of the data presentation mechanism. If desired, the digit driver circuit 177 can be provided with a suitable martix to suppress redundant zeros in the information supplied to the data presentation mechanism.

In this connection, when examining a plurality of samples, it is essential that the data presentation mechanism 114 supply information which identifies the sample, indicates the duration of the counting period, and identifies the number of counts stored in each of the counters 161 and 162. Accordingly, in addition to the counters and timer, a sample number program unit 178 (FIGURE 4) is provided in the circuitry of the present invention to yield the sample number information.

In a preferred embodiment of the invention, the sample number program unit 178 includes a pair of stepping switches having at least ten positions which are utilized to indicate the first and second digits of the sample number. When energized, as hereinafter fully described, the switches are advanced one position (i.e. from 00 to 01). In accordance with the position of the stepping switches, an output signal is supplied from the sample number program unit 178 through an output line 181 to the digit drivers circuit 177. This signal is supplied upon receipt of an interrogation pulse from the sequence generator 175 over line 179. As a result, suitable solenoids employed in the data presentation mechanism 114 are energized so that the sample number is immediately printed out.

In a conventional manner, subsequent output pulses from the sequence generator 175 sequentially interrogate each of the decades of the timer 173 thereby resulting in the elapsed time interval being typed out in response to the energization of other appropriate solenoids in the data presentation mechanism 114. Additional output pulses from the sequence generator 175 thereafter interrogate the counters 161 and 162. As a result, additional solenoids of the data presentation mechanism are energized, and the information stored in the counters is printed out in a conventional manner.

The final pulse from the sequence generator 175 is fed through an output line 182 to the master mechanical program generator 121. This results in the stepping switch employed therein being advanced to the next succeeding contact thereby signalling the completion of the detection and readout operations. In response to this signal being supplied to the master mechanical program generator 121, the index, hood and elevator drive units are rendered effective to effect the removal of the vial 14 from the detection chamber 18.

More particularly, the elevator drive unit 131 is initially energized to lower the elevator mechanism 29 and the vial 14 supported thereon. When the elevator is fully lowered, the hood 33 is withdrawn within the detection chamber in response to the operation of the control motor 34. After the hood 33 is fully retracted, the operation of the index drive motor 28 is again initiated. Accordingly, the next succeeding (designated "No. 2") sample carrying vial 14 is advanced to a position in alignment with the detection chamber and is positioned therein as outlined above.

Although the foregoing can be considered a typical operational mode of the circuitry of the present invention, various aforementioned auxiliary circuits are also employed therein which enhance the operational characteristics of a spectrometer employing same. In this connection, certain experiments call for and are enhanced by a plurality of successive examinations of each sample advanced into the sample detection chamber 18. Accordingly, the circuit of the present invention includes the replicates per sample program unit 126 including the stepping switch which can be adjusted by external controls and which is electrically connected to the stepping switch of the program generator 121.

More particularly, the stepping switch of the unit 126 can be set to allow a preset number of successive examinations to be completed before the sample carrying vial is discharged from the chamber. If so set, this stepping switch advances one increment rather than passing a signal from the program generator 121. That is, when a signal from the sequence generator 175 indicates the termination of a first examination of a sample confined within the detection chamber 18, the replicates per sample program stepping switch is advanced one position as a result of an output signal supplied thereto from the master mechanical program generator 121. This stepping switch of the unit 126 will not pass an energizing signal from the program generator to the mechanical function control unit 127 until the preset number of examinations established by the external command have been completed and the replicates per sample program unit thereby provides an energizing circuit to the control unit.

After each of the successive examinations, the readout of information resulting therefrom and supplied to the data presentation mechanism is still printed out in association with the same sample number as previously described. In this connection, the aforementioned stepping switches of the sample number program unit 178 are normally supplied with energizing signals from the replicates per sample program unit 126 so that these switches are successively advanced one position each time a new sample is introduced to the detection chamber 18. However, when a plurality of successive examinations are performed, energizing signals are not supplied to advance the stepping switches of the sample number program unit 178 until the preselected number of examinations has been completed. Accordingly, by selectively employing the replicates per sample program unit in the liquid scintillation spectrometer 10, it is possible to obtain a plurality of counts from each of the samples which is successively indexed into alignment with and advanced into the detection chamber.

While multiple sample examination operations as described above are preferable in some instances, situations also arise wherein it is desirable to limit complete measuring operations to samples having selected characteristics. For example, situations arise wherein one particular sample in a group of many samples is the only one on which complete data is desired. Assuming that one does not know which specific sample has the characteristics of interest but does know that these characteristics are manifested by decay events that yield more than 50 counts in a one-half minute period, the spectrometer circuitry can be adjusted to meet this situation.

More particularly, the low sample reject circuit 172 allows the circuit of the present invention to be conditioned by external commands so that only samples producing a selected number of counts during a preset time interval are subjected to a full measuring operation. In this connection and as previously described, the ungated output from each of the counters 161 and 162 and from the timer 173 is fed to the low sample reject circuit 172. The circuit 172 is preferably a set-reset flipflop circuit the conductive state of which is changed to produce a signal on an output line 191 if the preselected number of counts (e.g. 50) is not received before the preset time interval (e.g. 30 seconds). That is, if a sample being examined does not produce the requisite number of counts in the preset time interval, an output signal from the low sample reject circuit is fed to the master mechanical program generator 121. As a result, the master mechanical program generator 121 provides the necessary signal to allow the sequence generator 175 to initiate the aforedescribed readout operation. Therefore, the output line 191 from the low sample reject circuit effectively shunts that from the preset conditions unit 133 to initiate the termination of a measuring operation before the preset conditions are met.

As shown in FIGURE 6, another output line 190 from the low sample reject circuit 172 supplies a signal to a color shift unit 192 when a sample is to be rejected and the examination thereof prematurely terminated, as outlined above. When supplied with a signal from the low sample reject circuit, the color shift unit provides an energizing circuit for the color shift solenoid of the data presentation mechanism 114. Accordingly, the information corresponding to the rejected sample is typed out in a color distinct from that corresponding to the termination of a complete measuring operation (e.g. red rather than black type).

From the foregoing, it can be seen that the control circuit of the present invention accommodates extremely versatile liquid scintillation spectrometer operation. However, it is important that the control circuit also includes means for verifying the accuracy of the information provided thereby. In this connection, the additional photomultiplier 24 and the anticoincidence circuit associated therewith minimize inaccuracies due to extraneous background radiation. Therefore, it is important that the readout circuits be susceptible to desired verification checks.

To accomplish this, the check routine program unit 125 is employed. More particularly, the check routine program unit, which is preferably a suitable relay circuit, can be preset by suitable external commands so that there is a periodic verification of the information being stored by and derived from the counters 161 and 162 and the timer 173.

For example, by setting an external control provided on the control panel 36 of the spectrometer internal verifying signals are produced that are fed to the counters and are subsequently readout therefrom. More particularly, by properly establishing suitable external commands, a signal is provided from the sample number program unit after a preset number of samples have been examined. This signal is supplied through an output line 193 to the relay circuit of the check routine program unit 125. This signal actuates the check routine program unit so that an inhibiting signal is provided thereby through an output line 194 to the master mechanical program generator 121, and the normal output signals therefrom are temporarily blocked. Accordingly, although a sample is maintained in the detection chamber 18, there will not be any counts supplied thereby to the gated scaler drivers 152 and 153.

However, as shown in FIGURE 6, a conventional signal input (e.g. 60 cycles) is supplied to the gated scaler drivers. More particularly, a signal supplied from the check routine program unit 125 through an output line 196 conditions the gated scaler drivers 152 and 153 so that the reference signal information is passed thereby and supplied to the counters.

In accordance with the present invention, this signal information is fed to the counters 161 and 162 for a preselected time interval (e.g. one minute) established by the timer 173. After this time interval has elapsed, an output signal is supplied by the timer through an output line 198 to the check routine program unit 125, and the relay circuit therein is returned to a normal conductive state. When this occurs, the inhibiting signal fed through the output line 194 is cutoff, and the master mechanical program generator supplies an output signal to the sequence generator 175 to initiate the readout of the verifying information stored within the counters. Concomitant with this, a signal indicative of the return of the check routine program unit 125 to the normal conductive state is supplied over an output line 199 to the color shift unit 192. As a result, the verifying information is typed out in a manner distinguishable from that derived from the usual measuring operation.

From the foregoing it can be seen that the present invention provides an improved control circuit for a liquid scintillation spectrometer. The circuitry of the present invention not only accommodates extremely versatile spectrometer operation but also includes the necessary internal circuitry to insure (1) that the counting operations performed thereby are highly accurate and (2) that the data storage and readout circuits are functioning properly. In this connection, it should be understood that the photomultiplier 24 employed in the anticoincidence circuit could be mounted in direct optical communication with the detecting chamber 18 rather than in association with the anticoincidence shield. In such a case, the high voltage applied to this third photomultiplier would be suitably adjusted so that signals corresponding only to the incident background radiation would be passed thereby and fed through the anticoincidence channel.

It should be further understood that the foregoing is merely illustrative of the invention. Various modifications in the control circuitry could be devised by one skilled in the art without deviating from the invention. In this connection, various of the conventional circuits employed as counters, timers, amplifiers, etc., could be modified without departing from the invention, various features of which are set forth in the following claims.

What is claimed is:

1. A data handling and control circuit for apparatus for automatically measuring the radioactivity of a series of samples including a sample detection chamber wherein radioactive samples are successively positioned by suitable sample handling devices and wherein detecting operations are effected by means for detecting radioactive decay events which take place in and characterize the samples and for producing output signals corresponding to said decay events; which control circuit comprises a synchronizing circuit including circuit means conditioned by external commands for producing output signals in a preestablished sequence; a motor control circuit connected electrically to said synchronizing circuit for selectively and sequentially actuating the sample handling devices in response to output signals from said synchronizing circuit so that samples are successively introduced to the detection chamber, maintained therein during a detecting operation and removed therefrom upon the termination of a detecting operation; said synchronizing circuit supplying an output signal to said detecting means to initiate the detection of radioactive decay events thereby in response to the positioning of a sample in the detection chamber; data storage circuitry electrically connected to the output of said detecting means for storing the output signals produced thereby; first circuit means electrically connected to said data storage circuitry for establishing a normal duration for detecting operations to be performed, said first circuit means including means responsive to the termination of a complete detecting operation for producing an output signal corresponding thereto, said responsive means being electrically connected to said synchronizing circuit so that said output signal is supplied thereto; a second circuit means electrically connected to said synchronizing circuit and said data storage circuitry, said output signal from said responsive means causing an output signal to be produced by said synchronizing circuit that is supplied to said second circuit means to effect the readout of stored information upon the termination of a complete detecting operation; and a reject circuit electrically connected between said data storage circuit and said synchronizing circuit, said reject circuit including timing means and responding to signals from said data storage circuit to produce an output signal when the signals from said data storage at a predetermined elapsed time correspond to the detection of less than a predetermined number of events, said output signal being supplied to said synchronizing circuit, said synchronizing circuit thereupon effecting the premature termination of the detecting operation.

2. A data handling and control circuit for apparatus for automatically measuring the radioactivity of a series of samples including a sample detection chamber wherein radioactive samples are successively positioned by suitable sample handling devices and wherein detecting operations are effected by means for detecting radioactive decay events which take place in and characterize the samples and for producing output signals corresponding to said decay events; which control circuit comprises a synchronizing circuit for producing motor control, detector control and readout control output signals in a preestablished sequence; said synchronizing circuit supplying said detector control output signals to said detecting means to initiate the detection of radioactive decay events thereby only when a sample is positioned in the detection chamber; data storage circuitry electrically connected to the output of said detecting means for storing the output signals produced thereby; first circuit means electrically connected to said data storage circuitry for establishing the duration of a detecting operation performed on a sample, said first circuit means including means responsive to the termination of a detecting operation for producing an output signal corresponding thereto, said responsive means being electrically connected to said synchronizing circuit so that said output signal is supplied thereto; second circuit means electrically connected to said synchronizing circuit and said data storage circuitry, said output signal from said responsive means causing one of said readout control output signals to be produced by said synchronizing circuit that is supplied to said second circuit means to effect the readout of stored information upon the termination of a detecting operation; adjustable counting circuit means connected electrically to said synchronizing circuit and acting in response to said motor control output signals to produce an actuating signal upon receipt of a predetermined number of motor control output signals, said counting circuit means including means for adjusting said predetermined number; and a motor control circuit connected electrically to said adjustable counting circuit means for selectively and sequentially actuating the sample handling devices in response to said actuating signals from said adjustable counting circuit means so that samples are successively introduced to the detection chamber, maintained therein during said predetermined number of detecting operations and removed therefrom upon receipt of a succeeding actuating signal, whereby said predetermined number of successive detecting operations are carried out on each sample prior to the removal thereof from said detection chamber.

References Cited by the Examiner
UNITED STATES PATENTS

| | | | |
|---|---|---|---|
| 2,535,066 | 12/1950 | Herzog | 250—83.6 |
| 2,843,753 | 7/1958 | Meeder | 250—106 |
| 3,087,063 | 4/1963 | Gatzert | 250—106 |
| 3,114,835 | 12/1963 | Packard | 250—106 |
| 3,141,977 | 7/1964 | Fratantuno | 250—106 |

RALPH G. NILSON, *Primary Examiner.*

JAMES W. LAWRENCE, *Examiner.*

A. R. BORCHELT, *Assistant Examiner.*